Oct. 16, 1934.  F. R. HOUSE  1,976,727
SOUND LOCATOR AND COMPUTER FOR AIRCRAFT
Filed Aug. 7, 1930   8 Sheets-Sheet 1
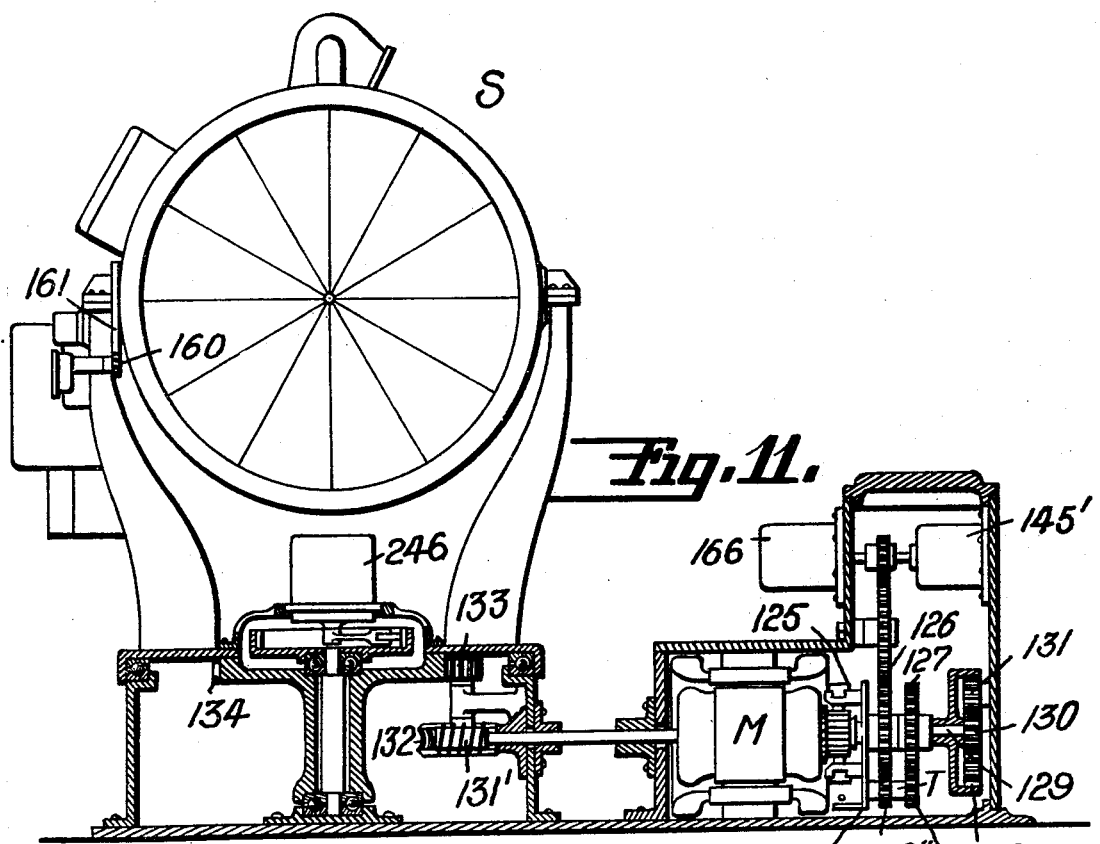
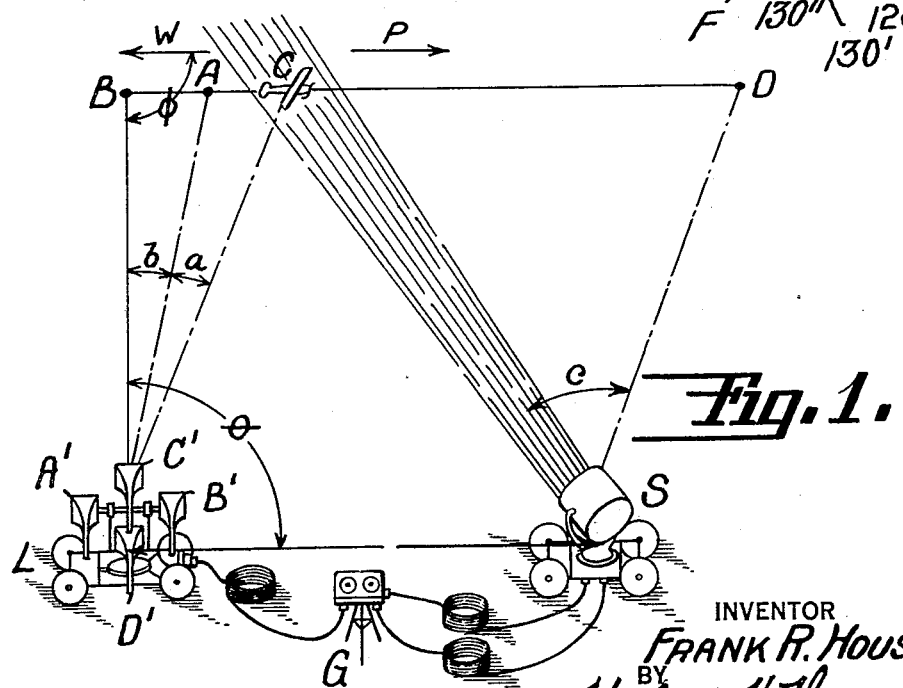
INVENTOR
FRANK R. HOUSE
BY
Herbert H. Thompson
his ATTORNEY.

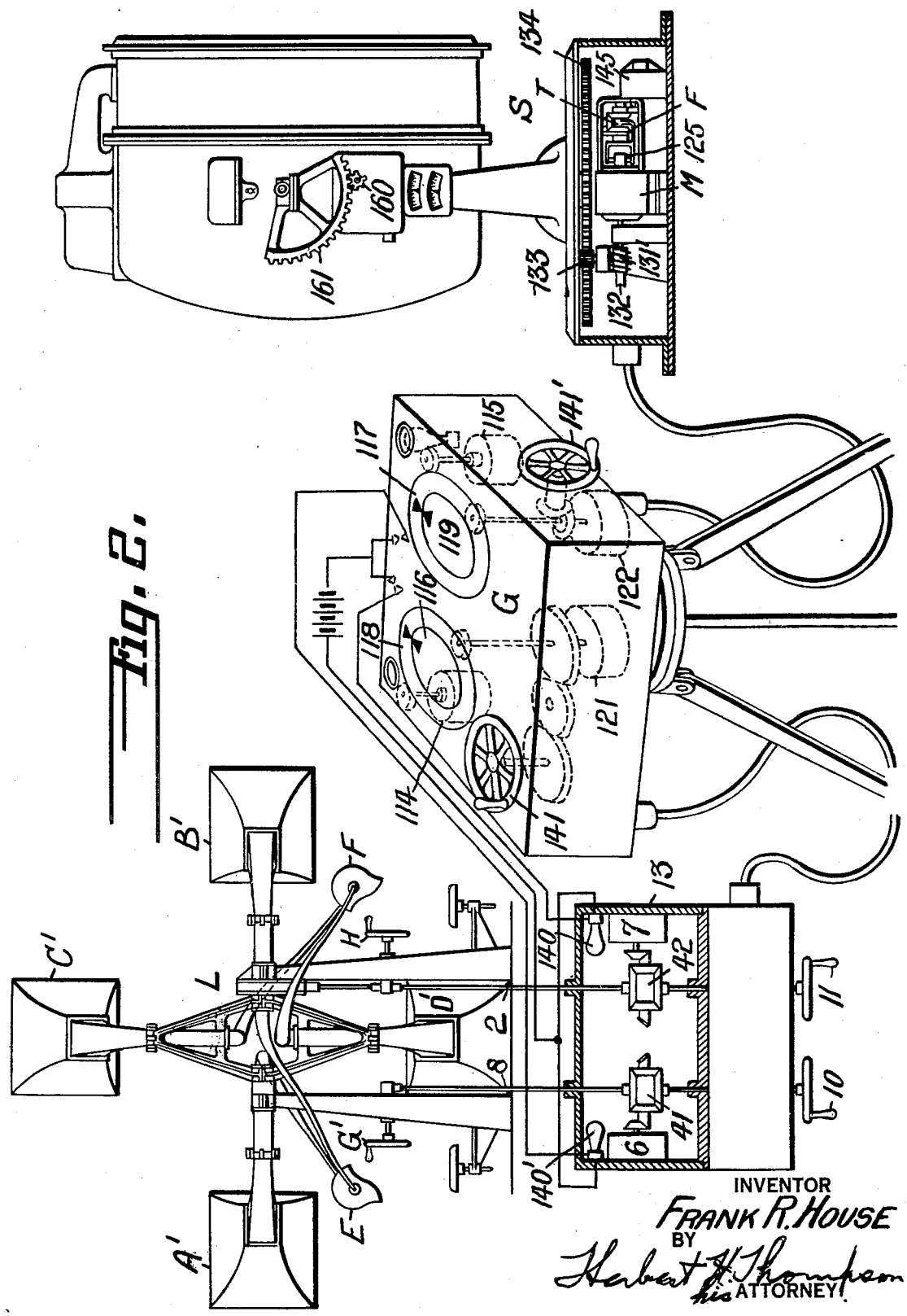

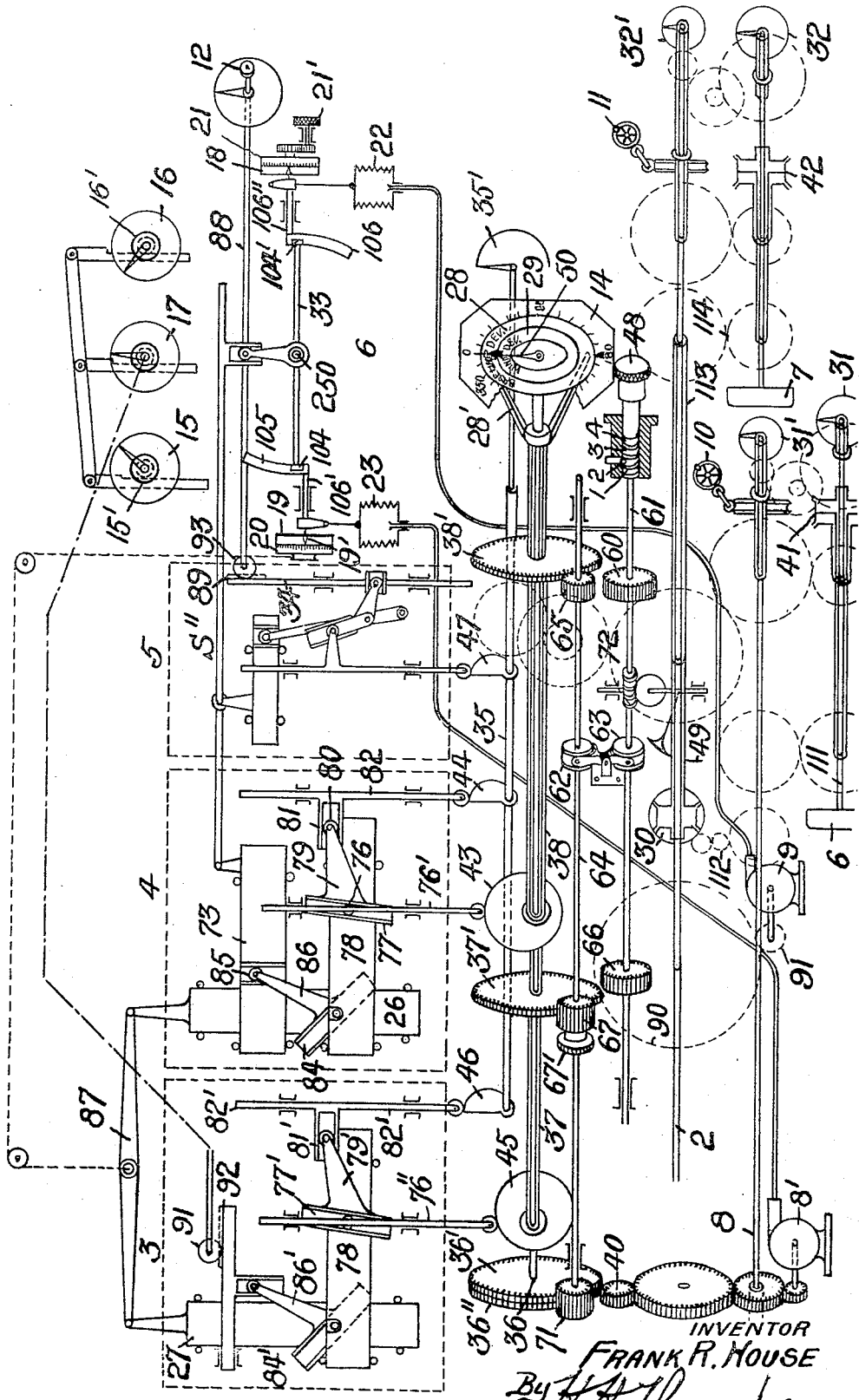

Oct. 16, 1934.  F. R. HOUSE  1,976,727
SOUND LOCATOR AND COMPUTER FOR AIRCRAFT
Filed Aug. 7, 1930  8 Sheets-Sheet 4
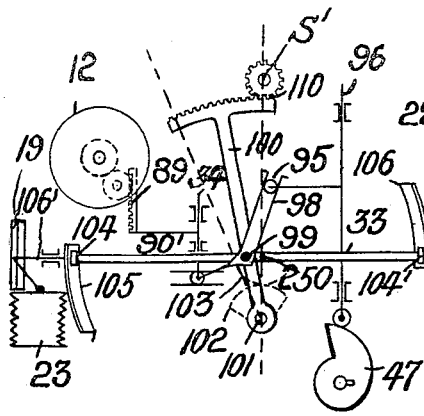
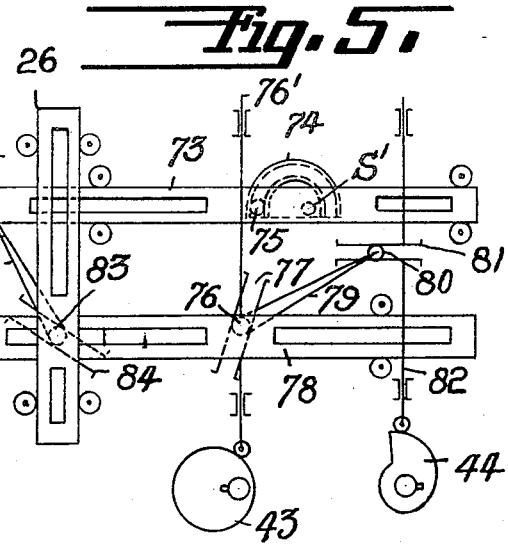
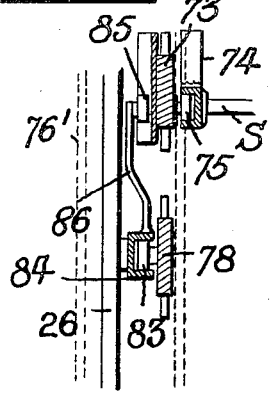
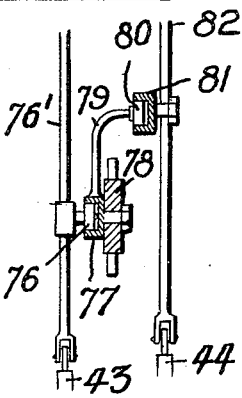
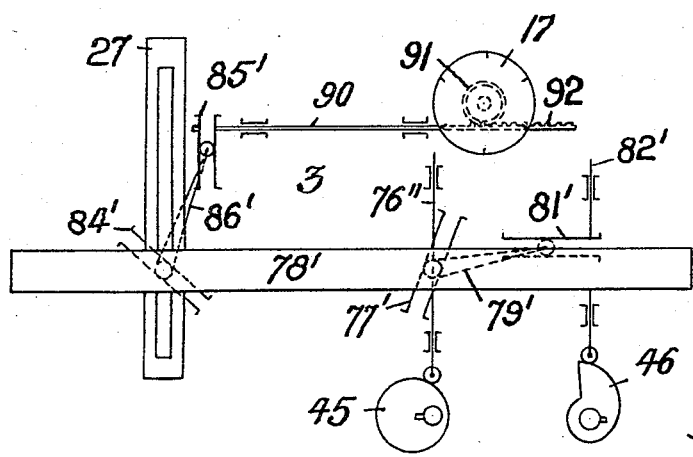
INVENTOR
FRANK R. HOUSE
BY Herbert H. Thompson
his ATTORNEY

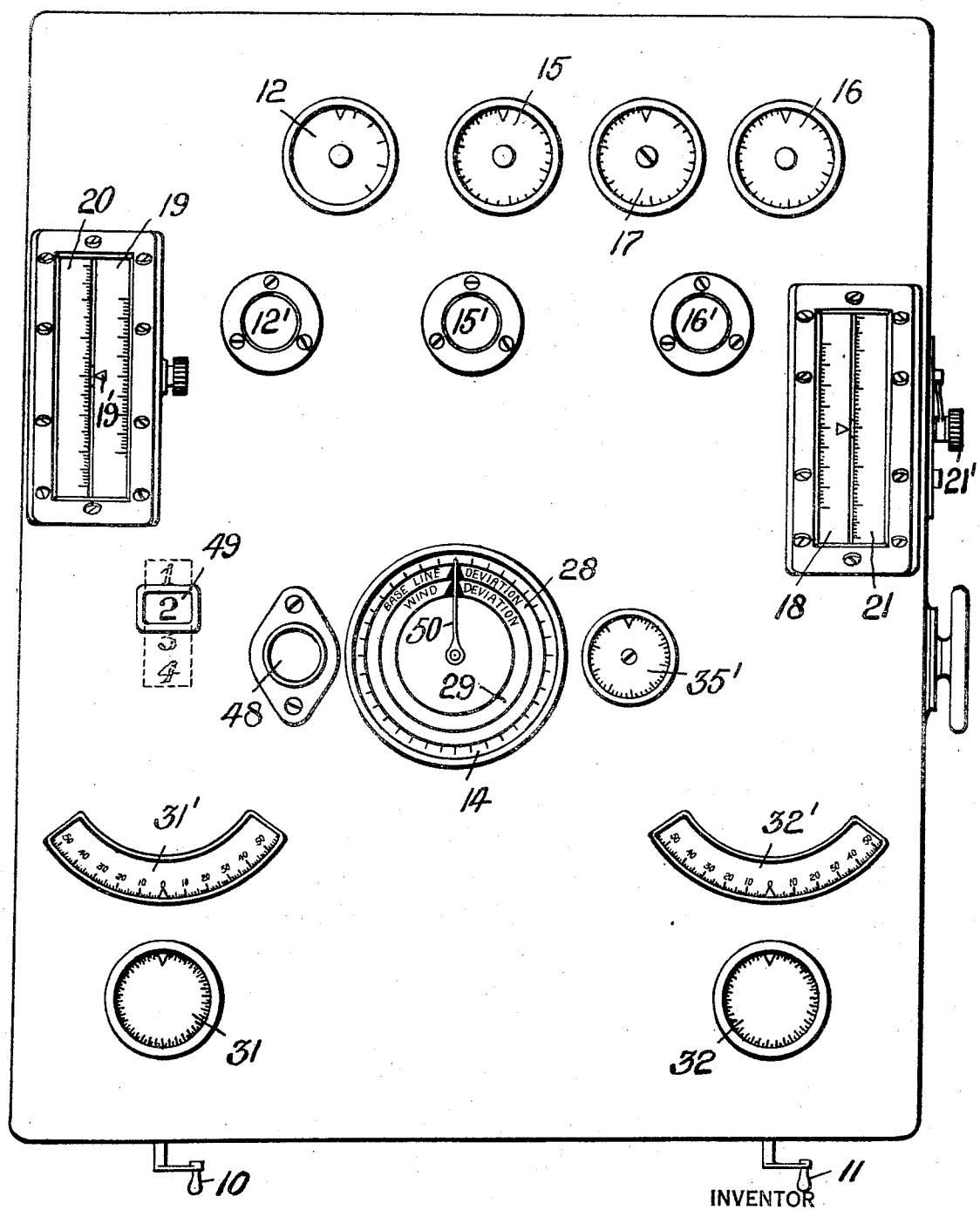

Oct. 16, 1934.　　　　　F. R. HOUSE　　　　　1,976,727
SOUND LOCATOR AND COMPUTER FOR AIRCRAFT
Filed Aug. 7, 1930　　　8 Sheets-Sheet 7

INVENTOR
FRANK R. HOUSE
BY
Herbert H. Thompson
ATTORNEY

INVENTOR
FRANK R. HOUSE
BY Herbert H. Thompson
his ATTORNEY.

Patented Oct. 16, 1934

1,976,727

UNITED STATES PATENT OFFICE 1,976,727

SOUND LOCATOR AND COMPUTER FOR AIRCRAFT

Frank E. House, Baldwin Harbor, N. Y., assignor to Sperry Gyroscope Company, Inc., Brooklyn, N. Y., a corporation of New York Application August 7, 1930, Serial No. 473,634

10 Claims. (Cl. 235—61.5)

This invention relates to apparatus for locating and illuminating aircraft at night so that antiaircraft gun fire may be directed thereon. For this purpose I propose to use a sound locating device such as a binaural sound locator and to transmit therefrom to the searchlight the location of the target, either directly or through a "comparator", after applying certain corrections.

The problem of which this invention is a solution may be best explained by reference to the elementary diagram in Fig. 1. In this figure the sound locator is shown at L, the searchlight at S and the comparator at G. The direction and ground speed of the airplane is indicated by vector P and the direction and the velocity of the wind is indicated by vector W. If the point A represents the position of the airplane at the time the sound was emitted, which is heard at L, then the airplane will be at point C by the time the sound reaches the sound locator and is heard by the operator. The angle a, therefore, represents what may be termed the sound lag angle or correction. On account of the direction and velocity of the wind, however, the operator at L does not perceive the sound as if it came from A, but receives it as if it came from the point B, the wind having carried the sound waves to the left during the time of transmission from A to L. The angle b, therefore, represents what may be termed the wind error or wind correction angle. If the searchlight, therefore, were located at L, it should be pointed along the line LC or SD, which is parallel to LC. It will be seen, however, that if the searchlight is pointed along SD it will not strike the target on account of the distance LS separating the searchlight and sound locator. Therefore, there is another correction introduced, namely, the angle c which is known as the parallax correction. It will be understood that all of these errors are shown in magnified form in the diagram and also the diagram shows azimuth errors only and in the simplest form where P and W and LS are parallel. There are also similar errors in elevation but since such errors are relatively small and are based on the same principle, the explanation regarding the same need not be repeated nor need all of them be taken into consideration in the preferred form of my apparatus.

Referring now to the detailed drawings in addition to Fig. 1,

Fig. 2 represents the same three elements, sound locator, comparator, and searchlight, as shown in Fig. 1 on a somewhat larger scale.

Fig. 3 is a diagrammatic view showing the elements entering into the correction device or computer which is preferably placed in the base of the sound locator.

Fig. 4 is a diagrammatic view of one of the layers or correction units of Fig. 3.

Fig. 5 is a diagrammatic view of the parallax correction layer.

Fig. 6 is a similar view of the wind correction layer.

Fig. 7 is a vertical section through the left hand portion of Fig. 5.

Fig. 8 is a section taken through the righthand portion of Fig. 5.

Fig. 9 is a face view of the complete computer.

Fig. 11 is a front elevation of the searchlight with the automatic azimuth control unit shown in section.

Figure 15:
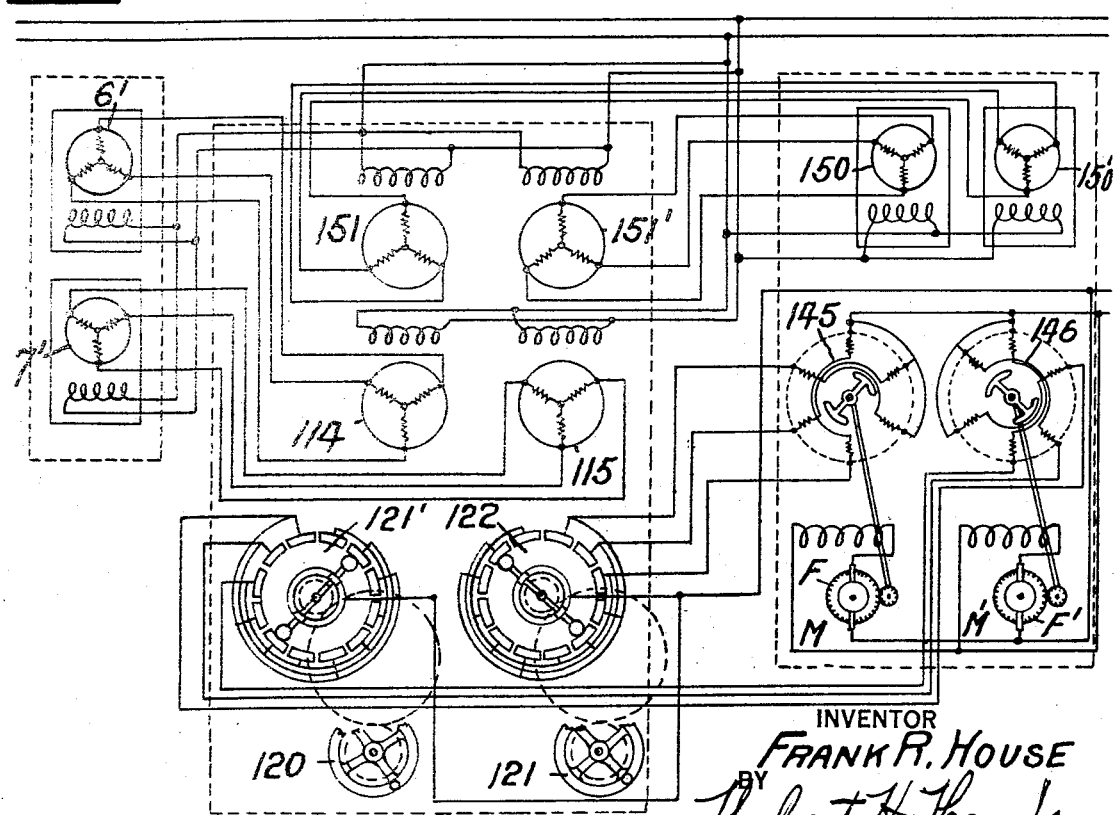

Fig. 15 is a similar view of a partly A. C. and partly D. C. step-by-step transmission system.

The sound locator is shown generally at L in Figs. 1 and 2 and preferably consists of a pair of horns A' and B' spaced apart in azimuth and another pair of horns C' and D' spaced apart in elevation. There is one operator for each pair of horns, the azimuth operator listening through the ear pieces in the helmet E and the elevation operator listening through the ear pieces in the helmet F. All the horns turn together but the azimuth operator turns them in azimuth through handle G', and the elevation operator similarly controls the horns in elevation through the handle H. The exact positions of the horns in azimuth and elevation are not transmitted, however, but the corrections, heretofore explained in connection with Fig. 1, are first introduced through the differentials 6 in azimuth and 7 in elevation, the computing mechanism being located in the base 13 of the sound locator.

Referring now to Fig. 3 showing the computer in diagrammatic, developed form, the azimuth shaft 3 connected to the sound locator is shown as entering the computer at the lower left hand corner of the figure, and the shaft 2 connected to the sound locator in elevation is shown as lying just above the shaft 8. The shaft 8 is shown as driving through suitable gearing 40 a gear 36" loose on the shaft 36 but which is normally coupled to shaft 36 through a gear 36' fixed to said shaft and a pinion 71 which meshes normally with both gears 36' and 36" and is mounted on a slidable shaft 64. Shaft 36 extends entirely through two sleeves, inner sleeve 37 and outer sleeve 38, and carries at its right hand end a pointer 50, which shows, therefore, continuously the compass or azimuth angle of the sound locator. Similarly the elevation angle is shown on dial 35' on shaft 35 which is geared to shaft 2 through gearing 72. The sleeve 37 is shown as driven from the gear 37' and carries at its right hand end the dial 29, which shows the compass wind deviation angle or the wind direction with respect to north, while the outer sleeve 38 is shown as driven from the gear 38' and carries through the arms 28' the concentric annular dial 28 which shows the compass baseline deviation angle or the angle that the baseline LS makes with north. In connection with these aforesaid dials and pointers, there is provided an outer fixed dial 14 having compass markings.

For the purpose of initially setting and synchronizing the device I provide a setting-knob 48 which is shown as having four positions. When the knob is pushed to its extreme right position, which may be termed the first position, the pinion 60 on the shaft 61 thereof is brought into mesh with the gear 38'. At the same time, due to the action of the pivoted clutch members 62—63, the shaft 64 is moved in the reverse direction throwing the pinion 65 to the left out of mesh with gear 38'. When the parts are in this position the knob 48 is turned until the dial 28 on the upper sleeve is set for the baseline deviation angle. When the knob is in the position shown in the drawings, i. e., position 2, the parts are in their normal operating position so that the proper correction data is continuously generated with the shaft 36 continuously driven from the shaft 8 through the gear train 40. When the knob is moved into the third position, that is, is pushed one notch to the left in Fig. 3, gear 66 is engaged with gear 37' but the gear 67 is thrown out of mesh with the gear 7', but leaving the pinion 71 in mesh with both gears 36' and 36" and pinion 65 remaining in mesh with gear 38'. In this position, therefore, the adjustment of the knob 48 sets the middle sleeve or the dial 29 for the wind deviation angle. In the fourth or synchronizing position, gear 66 remains in mesh with gear 37' and the extra gear 67' secured to the gear 67 is brought into mesh with the gear 37', and gear 71 is disengaged from loose gear 36" with which 40 meshes. If desired, an indicator 49 may be operated from knob 48 showing which of the four positions the knob is in (see Fig. 9). When knob 48 is turned, therefore, pointer 50 may be turned to show the angle the sound locator makes to north.

I take off from the several sleeves and shafts 38, 37 and 36 data for computing the wind correction, parallax correction and the sound lag correction. For this purpose there is shown mounted on the sleeve 38 (showing the baseline angle) a cam 43 which introduces a function of the angle of azimuth deviation, that is, the angle between the line LS connecting the sound locator and searchlight and the line connecting the sound locator and apparent target ($\angle \theta$ Fig. 1). Similarly the cam 45 is mounted on the sleeve 37 for introducing a function of the angle between the wind and the target bearing line ($\angle \phi$ Fig. 1).

Taking first the parallax correction and assuming for small angles that the tangent of the angle is approximately the same as the sine, this correction may be shown to be approximately expressed by the following equation:

$$\sin^{-1} x = \frac{B \sin \theta \sin \Delta}{A \cos \Delta} = \frac{B \sin \theta}{R \cos \Delta}$$

Where $x$ equals the parallax correction angle
 A equals the altitude of the target
 B equals the baseline LS
 $\theta$ equals the azimuth deviation angle
 $\Delta$ equals the elevation angle
 R equals the slant range, the slant range being $$R = \frac{A}{\sin \Delta}$$

The factor $\sin \theta$, therefore, is put into the equation by the cam 43 and the factor $$\frac{1}{\cos \Delta}$$

is put into the equation by cam 44 on the shaft 35 which is shown as driven from the shaft 2 through the train of gears shown in dotted lines at 72. The slant range is introduced into the mechanism by the rod S" (Fig. 3) which is shown as moving the slide 73 laterally from the slant range mechanism in layer 6. In Figs. 4 and 5, however, the slant range is introduced by the rotation of the shaft S' which turns the grooved eccentric 74, thereby moving the slide 73 laterally by the engagement of the pin 75 on the slide with the slot in the eccentric 74. The movement of the cam 43 moves up and down pin 76 on rod 76' which pin takes in a slide-way 77 which is positioned at an adjustable angle on bar 78 (Figs. 5 and 8). The angle of the slide 77 is determined by an arm 79 carrying a roller 80 at its end, which in turn engages in a horizontal slide-way 81 on the rod 82, which is moved from the cam 44. Slide 78 is, therefore, given a lateral movement dependent not only upon the position of the cam 43 but also the position of the cam 44 (i. e. $\sin \theta$ and $\cos \Delta$).

This movement of the slide 78 is in turn imparted to move up and down the cross bar 26. This is accomplished by the pin 83 secured to the slide 26 which engages in an angularly adjustable slide-way 84 pivoted on the cross bar 26, the angle being determined by the position of the bar 73 (R) through the engagement of roller 85 on an arm 86 secured to said slide-way 84. The output of the device, namely, the up and down movement of the bar 26 is taken out through the lever 87 (Fig. 3) where it is combined with the output of the wind correction layer output 27 and is transmitted to the final dial 20 showing the combined wind and parallax azimuth correction.

The wind correction layer is very similar in principle and solves the following equation $$\sin^{-1} y = \frac{V \sin \phi}{K \cos \Delta}$$

Where $y$ is the wind drift angle
 V the velocity of the wind
 K the velocity of sound
 $\phi$ the angle between the target and the wind, and
 $\Delta$ as before is the elevation angle.
The $\sin \phi$ is introduced by the cam 45 and $$\frac{1}{\cos \Delta}$$

is introduced by the cam 46. In this case the mechanisms connecting the vertical rods 76" and 82' actuated from the cams may be the same as before. The slant range, however, is not brought into this equation but instead the velocity of the wind and K are brought in through the setting of dial 17 (Figs. 3 and 6) which moves rod 90 rectilinearly through pinion 91 and rack teeth 92. This positions the vertical slide-way 85' to vary the angular position of the slide-way 84' on the laterally shiftable bar 76' and thus the bar 27 is moved up and down an amount proportional to the wind deviation angle. As shown in Fig. 3, however, there are three wind velocity setting dials, the ground wind velocity dial 15 set from knob 15', the altitude wind velocity dial 16 set from knob 16', which together turn the average wind velocity dial 17.

The slant range is shown as computed in the layer marked 5. As stated above, the slant range equals $$\frac{A}{\sin A}$$

Therefore I may use cam 47 on said shaft 35 for putting in a function of A and altitude is set into the device by the setting of the knob 12 on the shaft 88, which through rack 89 and pinion 93 moves the slide 34 up and down (Figs. 3 and 4).

A flat spring 90' may be provided between the rack 89 and the bar 34 (Fig. 4) so that the mechanism will not be damaged in case the maximum slant range for which the apparatus is designed is exceeded. The up and down movement of the bar 34 turns the bell crank lever 98 about its pivot 99 on the pivoted arm 100. Said bar 98 is also provided with a track-way in which the roller 95 on rod 96 engages. Therefore, it will be seen that the arm 100 is rocked about its pivot 101 an amount proportional to the combined functions of the elevation angle (A) and altitude, i. e., slant range (R). The output of this layer (R) is imparted to the shaft S' through the gear teeth 110 as shown in Fig. 4, and is also imparted to rotate a spring arm 33 about its pivot 250 for the purpose of entering into the final computation of the angular movement of the target during the time lag interval, which is computed in layer 6 (Fig. 3). In Fig. 4, however, the two layers 5 and 6 are shown super-imposed. This is accomplished by means of a small gear sector 102 secured to the arm 100 which meshes with another gear sector 103 secured to the spring arm 33. This leaf spring, therefore, is positioned in accordance with the slant range (R). Said arm carries at each end rollers 104—104' which engage angularly adjustable track-ways 105—106. Said track-ways are secured to shafts 106'—106 which are turned respectively from the azimuth sound lag actuated flexible bellows 23 and the elevation sound lag actuated flexible bellows 22. The former is shown as actuated from a reversible suction or pressure pump 8' driven from the shaft 8 and, therefore, rotated in accordance with the rate of azimuth angular travel of the sound locator. The latter bellows 22 is similarly actuated from a pump 9 driven from the elevation shaft 2 through the large gear 90 and pinion 91, pump 9 being driven in proportion to the rate of angular elevation of the sound locator. For a fuller description of this particular portion of the apparatus, reference is had to applicant's copending application No. 372,777, filed June 21, 1929 for Means for indicating rate and direction of movement. The pumps generate either positive or negative pressure according to their direction of rotation so that the bellows either expand or contract according to the direction of rotation of the pumps, the extent of movement being proportional to the pump's speed, due to a constant leak in each pump. On the shaft 106' is secured the indicating dial 19 which is, therefore, the sound lag indicating azimuth dial (i. e., angular rate multiplied by time equals angular distance), and to the shaft 106" is secured the dial 18 which is, therefore, the sound lag indicator dial in elevation. With the spring 33' positioned in line with the shaft 106' and 106", the bellows 22 and 23 will obviously turn the dials 18 and 19 through a maximum angle because the rotation of the shafts is unopposed by the spring 33. In this position the dials will indicate the maximum sound lag angle. As, however, the spring 33 is rotated about pivot 250, an increasing force is opposed to the expansion of the bellows and in that manner the dials indicate the rate in degrees per second, multiplied by the time in seconds, which is, of course, proportional to the slant range.

As shown (Figs. 3 and 9) the indicators 19 and 20 are placed side by side so that the markings on 20 (parallax plus wind corrections) are read with respect to an index 19' on 19 so that the readings of the two dials are thus algebraically added. The final reading, therefore, gives the total correction for wind, parallax and sound lag. Similarly there is mounted adjacent the dial 18 a second dial 21 for introducing the known error in elevation which is set in by means of the knob 21' which may put in the spotting corrections.

The total azimuth error is then introduced into the system automatically or by hand through the setting handle 10, the operator rotating this handle until the coarse and fine dials 31, 31' read the same as the reading of 19—20. Through the differential 41, this total correction is algebraically added to the azimuth angle of the sound locator which is brought in through shaft 8 and the final corrected angle transmitted through the shaft 111 to transmitter 6. Similarly the elevation correction indicated on dials 18 and 21 are put in through handle 11 so that the coarse and fine dials 32, 32' correspond to the readings of said first mentioned dials. This correction is then algebraically added to the elevation angle through the differential 42 and the final result transmitted to the transmitter 7. There may also be another slight correction in elevation due to the constructional mounting of the sound locator gears and this may be corrected for by differential 30, one side of which is driven from the shaft 2 and the other side from the shaft 8 through the gearing 112, the output of the differential driving the sleeve 113 which drives one side of the differential 42 through gearing 114.

The final output of the transmitters 6 and 7 is led as shown in Fig. 2 first to what is known as a comparator from which the searchlight is operated, and which "compares" or matches the train of the sound locator and searchlight. The comparator is preferably located at a distance from the sound locator and searchlight and has therein a repeater motor 114 actuated from the transmitter 6 and repeater motor 115 actuated from the transmitter 7 (see also Fig. 12). Each repeater motor operates an indicator 116—117 which shows respectively the position of the sound locator in azimuth and in elevation. A second pair of indicators 118—119 may be provided for showing the azimuth and elevation of the searchlight so that the operators, by matching the indexes on the two pairs of indicators, may keep the searchlight pointed in the proper position to illuminate the target. To this end there is provided handwheels 141, 141' for turning the dials 118—119 respectively and for also operating the connected transmitters 121—122 which control the searchlight from a distance in azimuth and in elevation.

The azimuth control is shown both in Fig. 2 and in Fig. 11, the latter being on a larger scale and showing also a slightly modified form of the invention. In this figure the repeater motor 145 (see also Fig. 12) is controlled from transmitter 121 and in turn controls the torque and direction of a power motor M. My preferred method of control is by shifting the relative position of the brushes 125 of the motor with respect to the field poles and this is shown as accomplished by turning a gear 126 from the motor 145', said gear forming one arm of the differential gear train T. The other arm comprises a gear 127 which is on the same hub as the internal gear 128 and is driven from shaft 129 of the motor M through pinions 130—131. The planetary arm of said gear train comprises the frame F on which are mounted the brushes 125 and on which also are mounted the intermeshing pinions 130 and 139, one of which meshes with the gear 127 and the other with the gear 126 and which also mesh with each other. The position of the brushes, therefore, is jointly controlled by the repeater motor 145' and the power motor M so that the power motor causes the searchlight to follow the movements of the repeater motor and relieves the repeater motor of all load. The power motor is shown as driving the searchlight through worm 131' on the shaft thereof driving the worm wheel 132 and pinion 133 which turns the large gear 134 on the base of the searchlight.

It will be understood that the searchlight is controlled in elevation by a similar mechanism through pinion 160 on the shaft motor M' which engages a segmental gear 161 on the trunnion shaft of the searchlight (Fig. 2)

Figure 12:
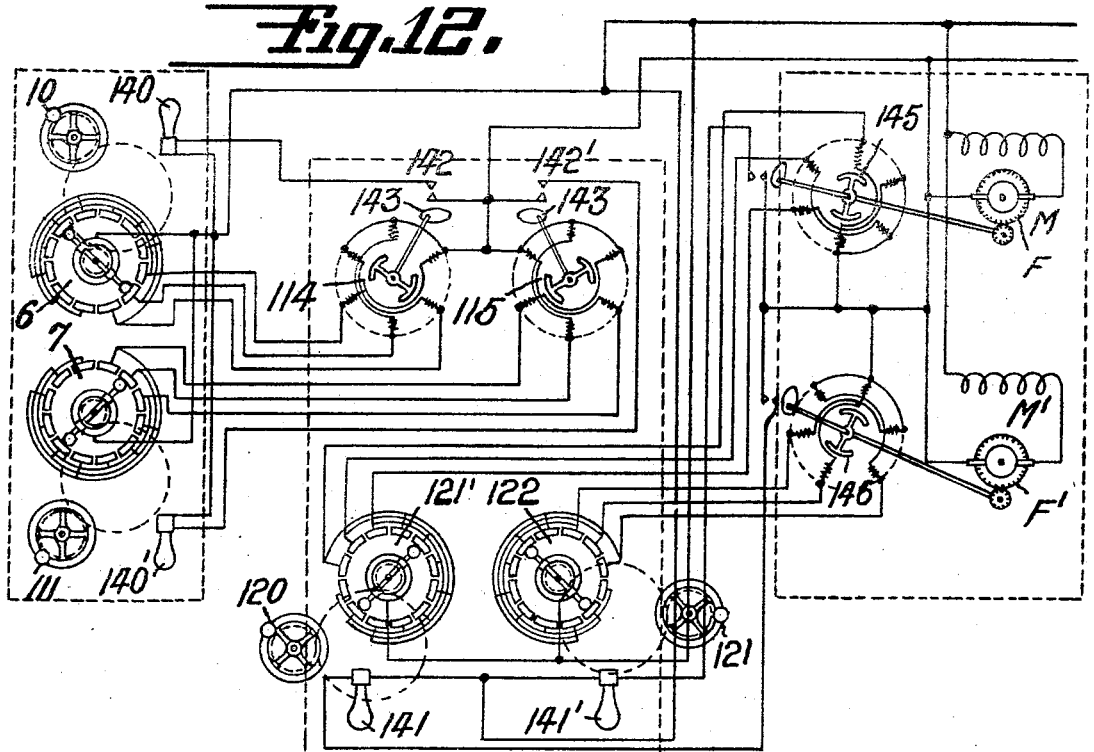
Fig. 12 is a wiring diagram of a direct current step-by-step system of controlling a searchlight through the comparator from the sound locator.

In the simplest form of the apparatus shown in Fig. 12 where direct current step-by-step motors are employed it is necessary to have some means for synchronizing the apparatus and to this end I have shown signal lights 140—140' at the sound locator and 141—141' at the computer. The first mentioned pair of lights are controlled respectively by switches 142—142' governed by cams 143 on the shafts of the repeater motors 114—115. These switches are designed to be closed by the cams when the indicators read zero so that the operators crank the transmitters around until the lights light and then by handles G' and H they turn the sound locator to point north and horizontal. Similarly the comparator operators turn the cranks 120—121 until the lamps 141—141' are lighted when it is known that the sound locator, comparator and searchlight are all pointing in the same direction and synchronized.

Figure 13:
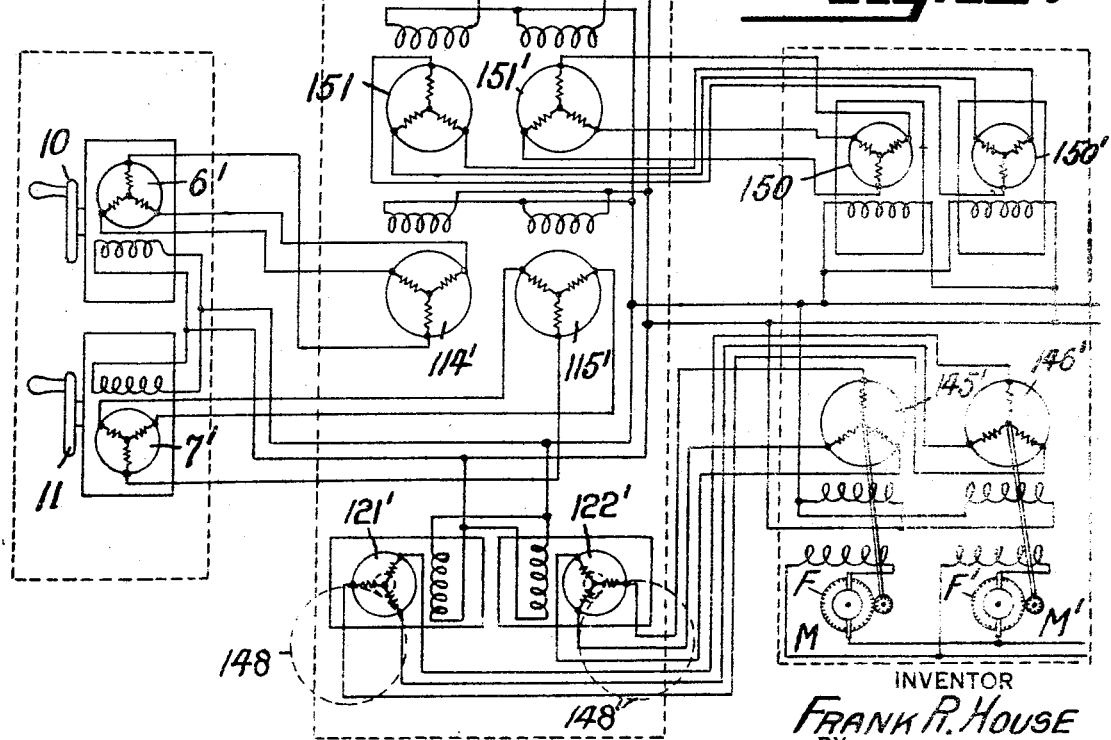
Fig. 13 is a similar diagram showing the use of A. C. synchronous motors in the system.

If desired a more or less self-synchronous system may be employed instead of the system shown in Fig. 12. Fig. 13 shows the use of alternating current Selsyn transmitters and motors, which system is partially self-synchronous. According to this system the Selsyn transmitter 6' in azimuth and 7' in elevation actuate as before, the repeater motors 114' and 115' and the transmitters 121' and 122' actuate the elevation and azimuth repeater motors 145' and 146' in the searchlight, the latter shifting the brushes of the power motors M—M' as before. In order to gain accuracy, however, in the searchlight control the transmitters 121' and 122' are not connected "one to one" to the sending instrument but are geared up thereto as indicated by the gearing 148—148' which, of course, destroys self-synchronism. Therefore it is desirable to have a synchronous repeat back system from the searchlight to the comparator and this is provided by the coarse or one-to-one transmitters 150—150' on the searchlight which actuate the coarse repeater motors 151—151' at the comparator, which thus replace the answer-back lights.

Fig. 15 is identical in principle with Fig. 13 except that in place of using fine Selsyn transmitters and motors from the comparator to the searchlight I employ the step-by-step transmitters 121 and 122 as in Fig. 12 and the step-by-step repeater motors 145 and 146. Fig. 15, therefore, combines the self-synchronous Selsyn system, which is used between the sound locator and comparator, as an answer-back from the searchlight to the comparator with the step-by-step system used as the main control from the comparator to the searchlight. This system has certain advantages since material torque is required to turn the brushes of the motor for which the step-by-step motors are better adapted than the Selsyn motors.

Figure 14:
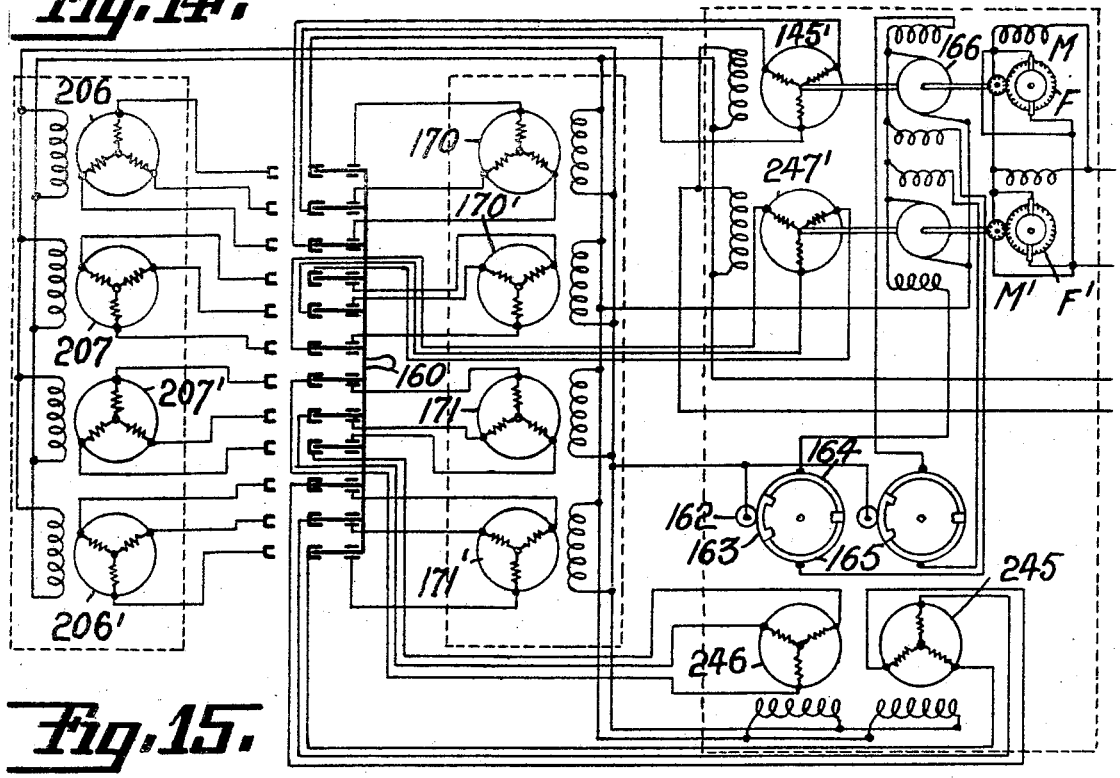
Fig. 14 is a similar diagram showing a completely self-synchronous system for controlling the searchlight.

A completely self-synchronous system is shown in Fig. 14. In this figure there is employed at the sound locator coarse and fine azimuth transmitters 206—206' and coarse and fine elevation transmitters 207 and 207'. Since the system is completely self-synchronous the angles transmitted may be led directly to the searchlight without going through a comparator. Therefore, when the double-throw switch 160 is thrown to the left, in Fig. 14, the aforesaid coarse and fine transmitters are connected respectively to the coarse azimuth repeater motor 245 and coarse elevation repeater motor 246 on the searchlight, while the fine transmitters 206' and 207' are connected respectively to the fine azimuth repeater motor 145' and fine elevation repeater motor 247' on the searchlight. In accordance with the system disclosed in my prior Patent No. 1,862,017 for Distant control mechanisms dated June 7, 1932, the searchlight is normally controlled from the fine motors 145' and 247' which turn the brushes of the power motors M as heretofore outlined. The azimuth coarse motor on the other hand is mounted on the base of the searchlight and the armature thereof carries a trolley 162 (Fig. 11) which normally contacts with the insulated segment 163 between two live segments 164—165, the ring carrying said segments being stationary on shaft 211. Said live segments are in circuit with the reversible power motor 166 so that if the searchlight should get out of synchronism with the sound locator to such an extent that the angle exceeds the angle subtended by the sector 163, the power motor 166 is brought into operation to overcome the Selsyn motor 145' and restore the searchlight within the limits of synchronism of the fine motor. The elevation control is identical through motor M', etc. The azimuth control is indicated in Fig. 11, it being understood that coarse motor 246 and its contacts are idle when the searchlight is employed in connection with the form of transmission shown in the preceding figures.

As soon as the searchlight has been brought near the target by the sound locator it may be desirable to switch the control to the comparator or other manual device so as to follow the target by sight. This may be effected easily by throwing the multiple pole switch 160 into the position shown in Fig. 14 when the searchlight is controlled from the auxiliary coarse and fine azimuth and elevation transmitters 170—170'—171—171', which it will be understood are turned by cranks 120 and 121.

Figure 10:
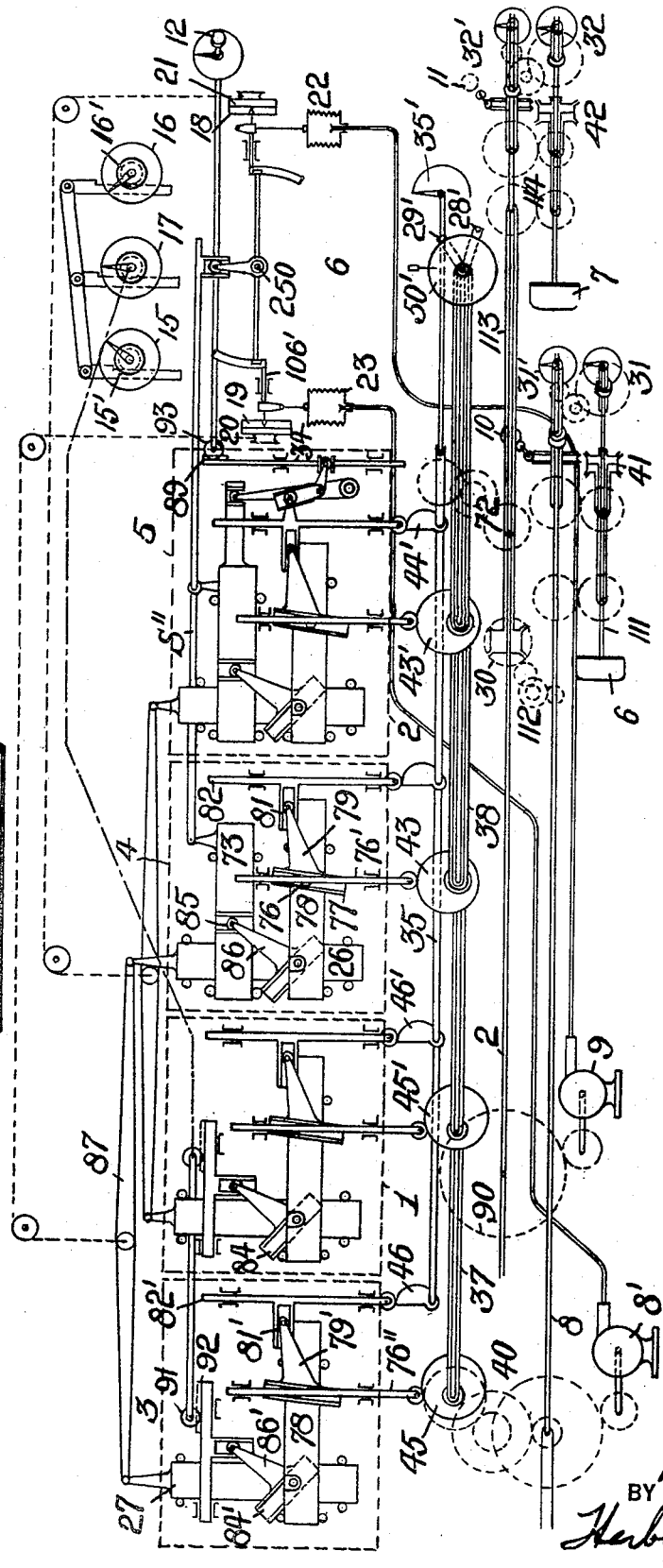
Fig. 10 is a diagrammatic view similar to Fig. 3 showing a similar correction device also adapted to correct in elevation as well as in azimuth.

As above stated the computer shown in Fig. 3 does not attempt to compute wind error in elevation or parallax error in elevation, since these quantities are so small as to be negligible within the limits of error of the remainder of the apparatus. For very accurate work, however, it may be desirable to include these corrections, and in Fig. 10 I have shown diagrammatically how all corrections may be introduced automatically. In this figure, layers 3, 4, 5 and 6 perform the same functions in the same manner as the corresponding layers in Fig. 3, namely, they introduce respectively the wind correction in azimuth, parallax correction in azimuth, and sound lag correction in azimuth and in elevation and finally comput the total errors in azimuth and elevation. In Fig. 10, however, I have added two other layers, layer 1 which computes the wind correction in elevation and layer 2 which computes the parallax correction in elevation. The latter is computed in accordance with the equation.

$$\sin^{-1} x' = \frac{B \cos \theta \sin \Delta}{R}$$

where the symbols represent the same angles as before. This computation is effected in layer 2 from the cams 43' and 44', layer 2 being combined with layer 5 so that there is also computed herein the slant range R. Similarly the wind correction is computed in layer 1 from the cams 45' and 46' in accordance with the equation $$\sin^{-1} y' = \frac{V \cos \phi \sin \Delta}{K}$$

where the symbols have the same meaning as in the previous equations. The summation of the azimuth correction from layers 3 and 4 is transmitted to the dial 20 and the summation of the elevation correction from layers 1 and 2 is transmitted to the dial 21. Layer 6 remains as before except that the dial 21 is set automatically from the elevation correction instead of through the knob 21.

There is also shown in this figure a simplified method of initially setting the cam shafts 36—37 and 38. In this instance the innermost shaft 36 is set by means of the dial 50', the inner sleeve 37 by the pointer 29' and the outer sleeve 38 by the pointer 28', all of which are locked in position by set screws (not shown) after being set. The remainder of the apparatus functions substantially as described in Fig. 3 and the description need not be repeated, the parts being given corresponding numbers throughout.

There are, however, numerous sources of error in elevation which cannot be calculated, such as the wind refraction error and the temperature refraction error so that the errors in elevation, even if computed for wind drift and parallax, are usually larger than those in azimuth. For this reason I prefer not to attempt to compute the elevation errors except the sound lag error but to compute accurately the azimuth errors, thereby limiting the field of searth of the searchlight to a substantially vertical plane or line. It is found that an aircraft can be picked up very quickly when the field of search is so limited.

The operation of my device is as follows: In setting up the computer for operation the device is synchronized by bringing the sound locator and searchlight to point north and horizontal while bringing all dials to zero as explained above. Then the dials of the computer are set as follows:

(1) Dial 28 is set for the direction with respect to north of the baseline LS between the sound locator and searchlight.

(2) The dial 29 is set for the direction of the wind ($\phi$).

(3) The dials 15 and 16 are set for the ground velocity of the wind and the elevation velocity of the wind respectively (V).

(4) The dial 12 is set for the estimated altitude of the plane (A).

The direction and velocity of the wind are given by the meteorological stations and the altitude of the plane is estimated by taking into account the atmospheric ceiling, type of plane, and the angular elevation when first heard. The formula for determining the corrections is such that errors in the making of estimation for altitude are relatively unimportant, the most important factor in the correction being the angular velocity of the target. The sound locator is then brought to bear upon the sounds coming from the target and is kept on such target by the listeners at E and F. The angular velocity in azimuth and elevation is determined automatically from the rate at which the sound locator is moved in following the attacking aircraft. This rate, combined with the four settings mentioned above, automatically generates the necessary corrections, the total of which is automatically indicated and continuously applied to the angle which the sound locator transmits to the comparator at the control station. The true position of the attacking aircraft is thus designated at the comparator and the searchlight is brought to bear upon the target. The errors are such that it is only necessary for a searchlight operator to sweep through an area of a very few degrees in elevation to pick up the target, and this sweeping operation can be accomplished within a few seconds. As soon as the target is picked up the searchlight may, of course, be controlled directly from the handles 141 and 141' without reference to the sound locator position.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A system for locating aircraft at night comprising a sound locator, a searchlight, means for positioning the searchlight in accordance with the position of the sound locator, an automatic correction device actuated primarily from said sound locator for continuously computing the sound lag error, and means for introducing said correction into said searchlight positioning means.

2. A system for locating aircraft at night comprising a sound locator, a searchlight, means for positioning the searchlight in accordance with the position of the sound locator, an automatic correction device actuated primarily from said sound locator for continuously computing the sound lag error, the parallax error and the wind error, and means for introducing all of said corrections into said searchlight positioning means.

3. A system for locating aircraft at night comprising a sound locator, a searchlight, means for computing the parallax error in azimuth, means for computing the wind in azimuth, means for computing the sound lag error in azimuth and in elevation, all of said means being primarily actuated from said sound locator, and means for continuously transmitting corrected sound locator azimuth and elevation angles including means for introducing the aforesaid computed errors.

4. Means for computing corrections for positioning searchlights from sound locator units including the combination with the sound locator and means for positioning the same in azimuth and elevation, computing mechanism actuated by the angular movements of the sound locator for computing the sound lag error in both azimuth and elevation, means for computing the azimuth parallax correction to compensate for the spacing of the sound locator and searchlight, means for computing the slant range from the altitude of the target and a function of the angle of elevation of the sound locator, and means for introducing said slant range as a measure of time in both the azimuth and elevation sound lag mechanisms to give the component sound lag errors and as a function in the azimuth parallax correction means.

5. Means for computing corrections for positioning searchlights from sound locator units including the combination with the sound locator and means for positioning the same in azimuth and elevation, means actuated by the angular movements of the sound locator for generating the angular rates of movement thereof in azimuth and elevation, means actuated by the azimuth position of the sound locator for computing the parallax correction to compensate for the spacing of the sound locator and searchlight, means for computing the slant range from the altitude of the target and a function of the angle of elevation of the sound locator, and means for introducing said slant range as a measure of time in both the azimuth and elevation rate mechanisms to give the component sound lag errors and as a function in the azimuth parallax correction means.

6. Means for computing corrections for positioning searchlights from sound locator units including the combination with the sound locator and means for positioning the same in azimuth and elevation, computing mechanism actuated by the angular movements of the sound locator for computing the sound lag error in both azimuth and elevation, means for computing the azimuth parallax correction to compensate for the spacing of the sound locator and searchlight, means for computing the slant range from the altitude of the target and a function of the angle of elevation of the sound locator, and means for introducing said slant range as a measure of time in at least the azimuth sound lag mechanisms to give the component sound lag errors and as a function in the azimuth parallax correction means.

7. Means for computing corrections for positioning searchlights from sound locator units including the combination with the sound locator and means for positioning the same in azimuth and elevation, means actuated by the angular movements of the sound locator for generating the angular rates of movement thereof in azimuth, means actuated by the azimuth position of the sound locator for computing the parallax correction to compensate for the spacing of the sound locator and searchlight, means for computing the slant range from the altitude of the target and a function of the angle of elevation of the sound locator, and means for introducing said slant range as a measure of time in the azimuth rate mechanism to give the component sound lag error and as a function in the azimuth parallax correction means whereby the field of search is limited to a line instead of a three dimensional search.

8. In a sound locator, means for computing the angular correction for sound lag comprising means for computing the slant range, means for generating the angular rate of movement of the sound locator in azimuth and in elevation, and means of combining a function of said range and the azimuth and elevation rate to give the angular correction in azimuth and elevation.

9. In an aircraft sound locator movable in azimuth and elevation, means for computing the angular corrections for sound lag comprising means for combining the elevation angle and altitude of the craft for slant range, means for generating the angular rate of movement of the sound locator in azimuth and elevation, and means for combining a function of said range with each of said rates to give both components of the angular correction.

10. In a system for flashing a searchlight on aircraft at night, the combination with a sound locator and remotely positioned searchlight and means for turning each in azimuth and elevation, angle transmitting means actuated by the turning of the sound locator to direct the searchlight, and correction mechanism for correcting the transmitted angles including means positionable in accordance with a function of the angle between the sound locator and the baseline between the searchlight and sound locator, means positionable in accordance with a function of the angle between the wind and said base, means positionable in accordance with a function of the elevation angle of said sound locator, means positionable in accordance with the altitude, a plurality of mechanical means actuated thereby for computing the sound lag angle at least in azimuth, the parallax angle and the wind correction angle, and means for introducing said correction into the transmitted angles.

FRANK R. HOUSE.